(12) United States Patent
Diab

(10) Patent No.: US 8,266,460 B2
(45) Date of Patent: *Sep. 11, 2012

(54) LAYER 2 POWER CLASSIFICATION SUPPORT FOR POWER-OVER-ETHERNET PERSONAL COMPUTING DEVICES

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 12/805,116

(22) Filed: Jul. 13, 2010

(65) Prior Publication Data

US 2010/0281288 A1 Nov. 4, 2010

Related U.S. Application Data

(63) Continuation of application No. 11/646,530, filed on Dec. 28, 2006, now Pat. No. 7,774,634.

(60) Provisional application No. 60/816,879, filed on Jun. 28, 2006.

(51) Int. Cl.
*G06F 1/26* (2006.01)

(52) U.S. Cl. ........................................ 713/300; 379/324

(58) Field of Classification Search .................. 379/322, 379/324; 713/300, 320
See application file for complete search history.

(56) References Cited

U.S. PATENT DOCUMENTS

| | | | |
|---|---|---|---|
| 5,889,381 A | 3/1999 | Wakefield | |
| 6,473,608 B1 | 10/2002 | Lehr et al. | |
| 6,764,343 B2 | 7/2004 | Ferentz | |
| 6,909,943 B2 | 6/2005 | Lehr et al. | |
| 6,986,071 B2 | 1/2006 | Darshan et al. | |
| 7,046,983 B2 | 5/2006 | Elkayam et al. | |
| 7,117,272 B2 | 10/2006 | Rimboim et al. | |
| 7,143,299 B1 | 11/2006 | Rubinstein et al. | |
| 7,203,849 B2 | 4/2007 | Dove | |
| 7,231,535 B2 | 6/2007 | Le Creff et al. | |
| 7,240,224 B1 * | 7/2007 | Biederman | 713/300 |

(Continued)

FOREIGN PATENT DOCUMENTS

WO WO 2005/036815 A1 4/2005

OTHER PUBLICATIONS

Non-Final Rejection mailed Oct. 28, 2009 for U.S. Appl. No. 11/646,523, filed Dec. 28, 2006; 7 pages.

(Continued)

*Primary Examiner* — Albert Wang
(74) *Attorney, Agent, or Firm* — Sterne, Kessler, Goldstein & Fox P.L.L.C.

(57) ABSTRACT

A Power-over-Ethernet (PoE) communication system dynamically provides power and data communications over a communications link. In an enterprise environment made up of one or more personal computing devices (e.g., personal or laptop computers), a switch determines a power classification for each device via a PoE control module that can be part of, for example, a Power Source Equipment/Powered Device (PSE/PD) system or a LAN-On-Motherboard/Powered Device (LOM/PD) system. A method of classifying power for each device includes detecting a device, polling it for power requirement information using a Layer 2 data link layer, receiving power requirement information from the device, and determining a power classification for the device. Power requirement information can include battery charge status, power load, power mode, etc., of the device. Various types of data packets can be used. The method can be repeated on a periodic basis, allowing power classification to be dynamic.

21 Claims, 12 Drawing Sheets

U.S. PATENT DOCUMENTS

| | | |
|---|---|---|
| 7,320,078 B2 | 1/2008 | Balestriere |
| 7,337,336 B2 | 2/2008 | Ferentz et al. |
| 7,340,325 B2 | 3/2008 | Sousa et al. |
| 7,343,506 B1 | 3/2008 | Fenwick |
| 7,363,525 B2 | 4/2008 | Biederman et al. |
| 7,368,798 B2 | 5/2008 | Camagna et al. |
| 7,454,641 B2 | 11/2008 | Connor et al. |
| 7,549,067 B2 | 6/2009 | Tolliver |
| 7,774,634 B2 | 8/2010 | Diab |
| 7,890,776 B2 | 2/2011 | Diab et al. |
| 2005/0097378 A1 | 5/2005 | Hwang |
| 2005/0136989 A1 | 6/2005 | Dove |
| 2005/0276023 A1 | 12/2005 | Zansky et al. |
| 2006/0215680 A1 | 9/2006 | Camagna |
| 2006/0242458 A1 | 10/2006 | Feldman et al. |
| 2006/0244462 A1 | 11/2006 | McCosh et al. |
| 2006/0251179 A1 | 11/2006 | Ghoshal |
| 2007/0041577 A1 | 2/2007 | Ghoshal et al. |
| 2007/0074052 A1 | 3/2007 | Hemmah et al. |
| 2007/0079151 A1 | 4/2007 | Connor et al. |
| 2007/0106913 A1 | 5/2007 | Lewis et al. |
| 2007/0110360 A1 | 5/2007 | Stanford |
| 2007/0135086 A1 | 6/2007 | Stanford |
| 2007/0198748 A1 | 8/2007 | Ametsitsi et al. |
| 2007/0220280 A1 | 9/2007 | Karam et al. |
| 2007/0257780 A1 | 11/2007 | Schindler |
| 2008/0005433 A1 | 1/2008 | Diab et al. |
| 2008/0005600 A1 | 1/2008 | Diab et al. |
| 2008/0005601 A1 | 1/2008 | Diab |
| 2008/0005602 A1 | 1/2008 | Diab et al. |
| 2008/0016263 A1 | 1/2008 | Diab et al. |
| 2008/0052546 A1 | 2/2008 | Schindler |
| 2009/0228722 A1 | 9/2009 | Lin |
| 2009/0265563 A1 | 10/2009 | Camagna et al. |
| 2011/0131428 A1 | 6/2011 | Diab et al. |

OTHER PUBLICATIONS

Non-Final Rejection mailed Jun. 9, 2010 for U.S. Appl. No. 11/646,523, filed Dec. 28, 2006; 6 pages.

Notice of Allowance mailed Sep. 21, 2010 for U.S. Appl. No. 11/646,523, filed Dec. 28, 2006; 6 pages.

Non-Final Rejection mailed Dec. 21, 2011 for U.S. Appl. No. 13/022,143, filed Feb. 7, 2011; 7 pages.

Non-Final Rejection mailed Oct. 6, 2009 for U.S. Appl. No. 11/646,530, filed Dec. 28, 2006; 8 pages.

Notice of Allowance mailed Apr. 2, 2010 for U.S. Appl. No. 11/646,530, filed Dec. 28, 2006; 4 pages.

*802.3af™, IEEE Standard for Information Technology—Telecommunications and information exchange between systems—Local and metropolitan area networks—Specific requirements, Part 3: Carrier Sense Multiple Access with Collision Detection (CSMA/CD) Access Method and Physical Layer Specifications, Amendment: Data Terminal Equipment (DTE) Power via Media Dependent Interface (MDI)*, IEEE Computer Society, IEEE, New York, NY, ISBN 0-7381-3696-4 (SH95132) (Print), ISBN 0-7381-3697-2 (SS95132) (PDF), Jun. 18, 2003, pp. i-x and 1-121 (133 pages total).

\* cited by examiner

LAYER 2 POWER CLASSIFICATION SUPPORT FOR POWER-OVER-ETHERNET PERSONAL COMPUTING DEVICES

CROSS REFERENCE TO RELATED APPLICATIONS

This application is a continuation of U.S. patent application Ser. No. 11/646,530, filed Dec. 28, 2006, now U.S. Pat. No. 7,774,634, which claims benefit of U.S. Provisional Patent Application No. 60/816,879, filed on Jun. 28, 2006, each of which is incorporated by reference herein in its entirety.

BACKGROUND OF THE INVENTION

1. Field of the Invention

The present invention generally relates to personal computing devices (e.g., personal or laptop computers) in a Power over Ethernet (PoE) system, and more specifically to power classification and management of these devices in an enterprise environment.

2. Related Art

Ethernet communications provide high speed data communications over a communications link between two communication nodes that operate according the IEEE 802 Ethernet Standard. The communications medium between the two nodes can be twisted pair wires for Ethernet, or other types of communications medium that are appropriate. Power over Ethernet (PoE) communication systems provide power and data communications over a common communications link. More specifically, a power source device (e.g., power source equipment (PSE)) connected to the physical layer of the first node of the communications link provides DC power (for example, 48 volts DC) to a powered device (PD) at the second node of the communications link. The DC power is transmitted simultaneously over the same communications medium with the high speed data from one node to the other node.

The PSE device is often a data switch. Typically, a PSE on a switch is called an endspan device. The switch is typically a networking bridge device with data ports that can additionally have routing capability. The switch could have as little as two data ports or as many as 400 or more data ports. It may have two or more rows of data ports, where a data port in an input row of data ports can be switched to any one of the data ports in an output row of data ports. Each data port can include a serial-to-parallel (i.e. SERDES) transceiver, and/or a PHY device, to support high speed serial data transport. Herein, data ports and their corresponding links can be interchangeably referred to as data channels, communication links, data links, etc, for ease of discussion.

Typical PD devices that utilize PoE include Internet Protocol (EP) phones (Voice over IP (VoIP) phones), wireless access points, etc. Personal computing devices, such as personal or laptop computers, are another example of PD devices. The power requirements of personal computing devices are significantly different and often much higher than that of VoIP phones and wireless access points. For example, while VoIP systems can have unsubscribed power, personal computing devices in enterprise systems oversubscribe power. In addition, a personal computing device may change its power draw depending on its application load. Moreover, personal computing devices can power other devices such as USB devices or external drives, for example, which will affect total power draw.

The powering of personal computing devices using PoE in an enterprise environment places a tremendous noise and power density burden on a switch PSE. For example, in a conference room of ten people with laptops, a typical 10-port PoE switch would require approximately 25 watts (25 W) of PoE per port to go to each laptop. This totals 250 W, which can actually total more than 300 W if assuming an 80% AC/DC conversion efficiency. More may be required if one or more of the laptops are executing higher power applications, or powering a USB device, for example, or if trickle or regular charging is required. In addition, the switch itself needs approximately 2 W per port just for the data portion of the networking. As the number of ports increases, the power needs increase. Moreover, the cost of power supplies, cooling, and noise issues do not scale linearly, but instead progressively worsen with the increase in power.

In a typical PoE system, power for a PoE PD is classified using information regarding voltage, current draw, and the like, over a Layer 1 type physical communication layer. This is a one-way (i.e., from a PD to a switch), one-time (i.e., static) classification that occurs at the time of connection. The power classification determines how much power is needed by a PD. In an enterprise environment consisting of personal computing devices in which many of the devices could be demanding power all at one time, it is extremely difficult to manage the supply of power to each device and virtually impossible to adjust the supply of power as the power needs change.

What is needed is an intelligent PoE system in which the power supplied to multiple PoE personal computing devices can be dynamically and optimally classified and managed based on changing conditions while reducing noise issues, power supply cooling issues, and the overall cost of a switch by reducing the size of the power supply needed. Specifically, what is needed is a mechanism in an enterprise environment that dynamically classifies, allocates, and prioritizes, via one or more algorithms, for example, power supplied to PoE personal computing devices. A higher level of data communication support (such as data link layer (Layer 2) support) for such a mechanism is also needed.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

DETAILED DESCRIPTION OF THE INVENTION

The following describes an intelligent PoE system in which the power supplied to multiple personal computing devices, such as those found in an enterprise environment, can be dynamically and optimally classified and managed based on changing conditions. A mechanism in an enterprise environment is described that dynamically allocates and prioritizes, via one or more algorithms, for example, power supplied to PoE personal computing devices. Also described is data link layer (Layer 2) support for such a mechanism. The discussion begins with a description of a conventional PoE system.

Figure 1:
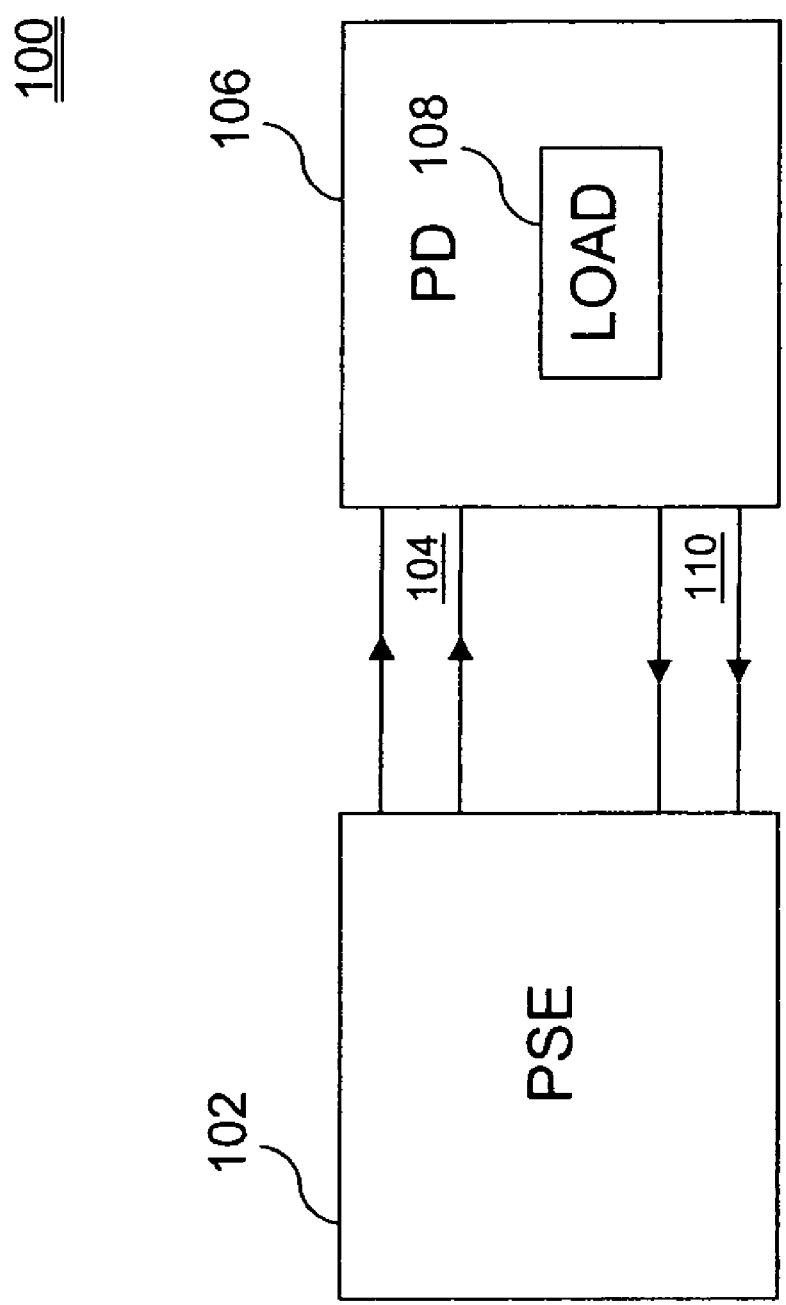
FIG. 1 is a block diagram of a conventional Power over Ethernet (PoE) system.

FIG. 1 is a high level illustration of a conventional Power over Ethernet (PoE) system 100 that provides both DC power and data communications over a common data communications medium. Referring to FIG. 1, power source equipment (PSE) 102 provides DC power over conductors 104, 110 to a powered device (PD) 106 having a representative electrical load 108. The PSE 102 and PD 106 also include data transceivers that operate according to a known communications standard, such as the IEEE Ethernet standard. More specifically, the PSE 102 includes a physical layer device on the PSE side that transmits and receives high speed data with a corresponding physical layer device in the PD 106, as will be discussed further below. Accordingly, the power transfer between the PSE 102 and the PD 106 occurs simultaneously with the exchange of high speed data over the conductors 104, 110. In one example, the PSE 102 is a data switch having multiple ports that is in communication with one or more PD devices, such as Internet phones, or wireless access points.

The conductor pairs 104 and 110 can carry high speed differential data communications. In one example, the conductor pairs 104 and 110 each include one or more twisted wire pairs, or any other type of cable or communications media capable of carrying the data transmissions and DC power transmissions between the PSE and PD. In Ethernet communications, the conductor pairs 104 and 110 can include multiple twisted pairs, for example four twisted pairs for 10 Gigabit Ethernet. In 10/100 Ethernet, only two of the four pairs carry data communications, and the other two pairs of conductors are unused. Herein, conductor pairs may be referred to as Ethernet cables or communication links for ease of discussion.

Figure 2:
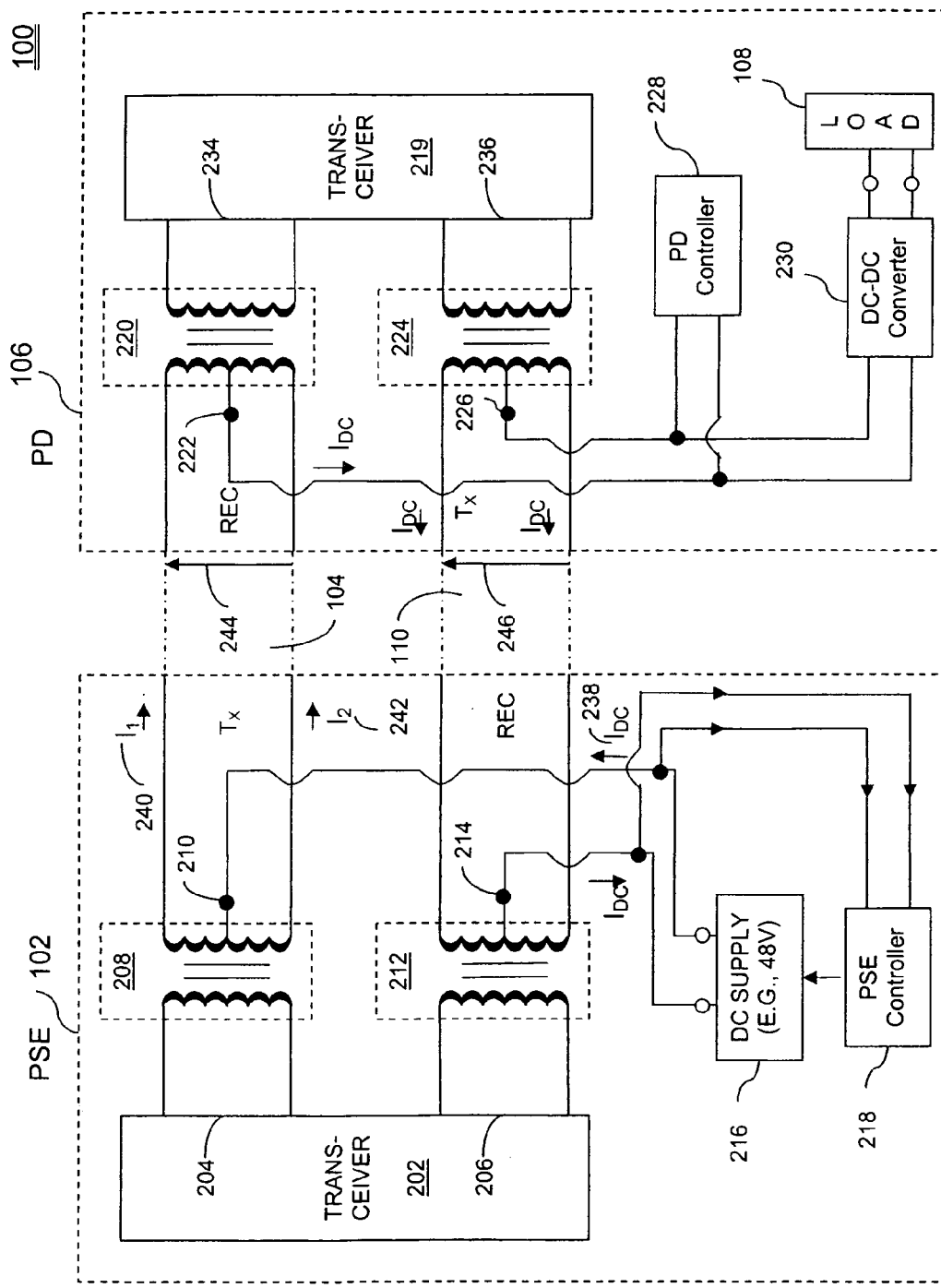
FIG. 2 illustrates a more detailed figure of the conventional power transfer from Power Source Equipment (PSE) to a Powered Device (PD) in a conventional PoE communications system.

FIG. 2 provides a more detailed circuit diagram of the PoE system 100, where PSE 102 provides DC power to PD 106 over conductor pairs 104 and 110. PSE 102 includes a transceiver physical layer device (or PHY) 202 having full duplex transmit and receive capability through differential transmit port 204 and differential receive port 206. (Herein, transceivers may be referred to as PHYs.) A first transformer 208 couples high speed data between the transmit port 204 and the first conductor pair 104. Likewise, a second transformer 212 couples high speed data between the receive port 206 and the second conductor pair 110. The respective transformers 208 and 212 pass the high speed data to and from the transceiver 202, but isolate any low frequency or DC voltage from the transceiver ports, which may be sensitive to large voltage values.

The first transformer 208 includes primary and secondary windings, where the secondary winding (on the conductor side) includes a center tap 210. Likewise, the second transformer 212 includes primary and secondary windings, where the secondary winding (on the conductor side) includes a center tap 214. The DC voltage supply 216 generates an output voltage that is applied across the respective center taps of the transformers 208 and 212 on the conductor side of the transformers. The center tap 210 is connected to a first output of a DC voltage supply 216, and the center tap 214 is connected to a second output of the DC voltage supply 216. As such, the transformers 208 and 212 isolate the DC voltage from the DC supply 216 from the sensitive data ports 204, 206 of the transceiver 202. An example DC output voltage is 48 volts, but other voltages could be used depending on the voltage/power requirements of the PD 106.

The PSE 102 further includes a PSE controller 218 that controls the DC voltage supply 216 based on the dynamic needs of the PD 106. More specifically, the PSE controller 218 measures the voltage, current, and temperature of the outgoing and incoming DC supply lines so as to characterize the power requirements of the PD 106.

Further, the PSE controller 218 detects and validates a compatible PD, determines a power classification signature for the validated PD, supplies power to the PD, monitors the power, and reduces or removes the power from the PD when the power is no longer requested or required. During detection, if the PSE finds the PD to be non-compatible, the PSE can prevent the application of power to that PD device, protecting the PD from possible damage. IEEE has imposed standards on the detection, power classification, and monitoring of a PD by a PSE in the IEEE 802.3Af™ standard, which is incorporated herein by reference.

Still referring to FIG. 2, the contents and functionality of the PD 106 will now be discussed. The PD 106 includes a transceiver physical layer device 219 having full duplex transmit and receive capability through differential transmit port 236 and differential receive port 234. A third transformer 220 couples high speed data between the first conductor pair 104 and the receive port 234. Likewise, a fourth transformer 224 couples high speed data between the transmit port 236 and the second conductor pair 110. The respective transformers 220 and 224 pass the high speed data to and from the transceiver 219, but isolate any low frequency or DC voltage from the sensitive transceiver data ports.

The third transformer 220 includes primary and secondary windings, where the secondary winding (on the conductor side) includes a center tap 222. Likewise, the fourth transformer 224 includes primary and secondary windings, where the secondary winding (on the conductor side) includes a center tap 226. The center taps 222 and 226 supply the DC power carried over conductors 104 and 110 to the representative load 108 of the PD 106, where the load 108 represents the dynamic power draw needed to operate PD 106. A DC-DC converter 230 may be optionally inserted before the load 108 to step down the voltage as necessary to meet the voltage requirements of the PD 106. Further, multiple DC-DC converters 230 may be arrayed in parallel to output multiple different voltages (3 volts, 5 volts, 12 volts, for example) to supply different loads 108 of the PD 106.

The PD 106 further includes a PD controller 228 that monitors the voltage and current on the PD side of the PoE configuration. The PD controller 228 further provides the necessary impedance signatures on the return conductor 110 during initialization, so that the PSE controller 218 will recognize the PD as a valid PoE device, and be able to classify its power requirements.

During ideal operation, a direct current ($I_{DC}$) 238 flows from the DC power supply 216 through the first center tap 210, and divides into a first current ($I_1$) 240 and a second current ($I_2$) 242 that is carried over conductor pair 104. The first current ($I_1$) 240 and the second current ($I_2$) 242 then recombine at the third center tap 222 to reform the direct current ($I_{DC}$) 238 so as to power PD 106. On return, the direct current ($I_{DS}$) 238 flows from PD 106 through the fourth center tap 226, and divides for transport over conductor pair 110. The return DC current recombines at the second center tap 214, and returns to the DC power supply 216. As discussed above, data transmission between the PSE 102 and the PD 106 occurs simultaneously with the DC power supply described above. Accordingly, a first communication signal 244 and/or a second communication signal 246 are simultaneously differentially carried via the conductor pairs 104 and 110 between the PSE 102 and the PD 106. It is important to note that the communication signals 244 and 246 are differential signals that ideally are not affected by the DC power transfer.

Figure 3:
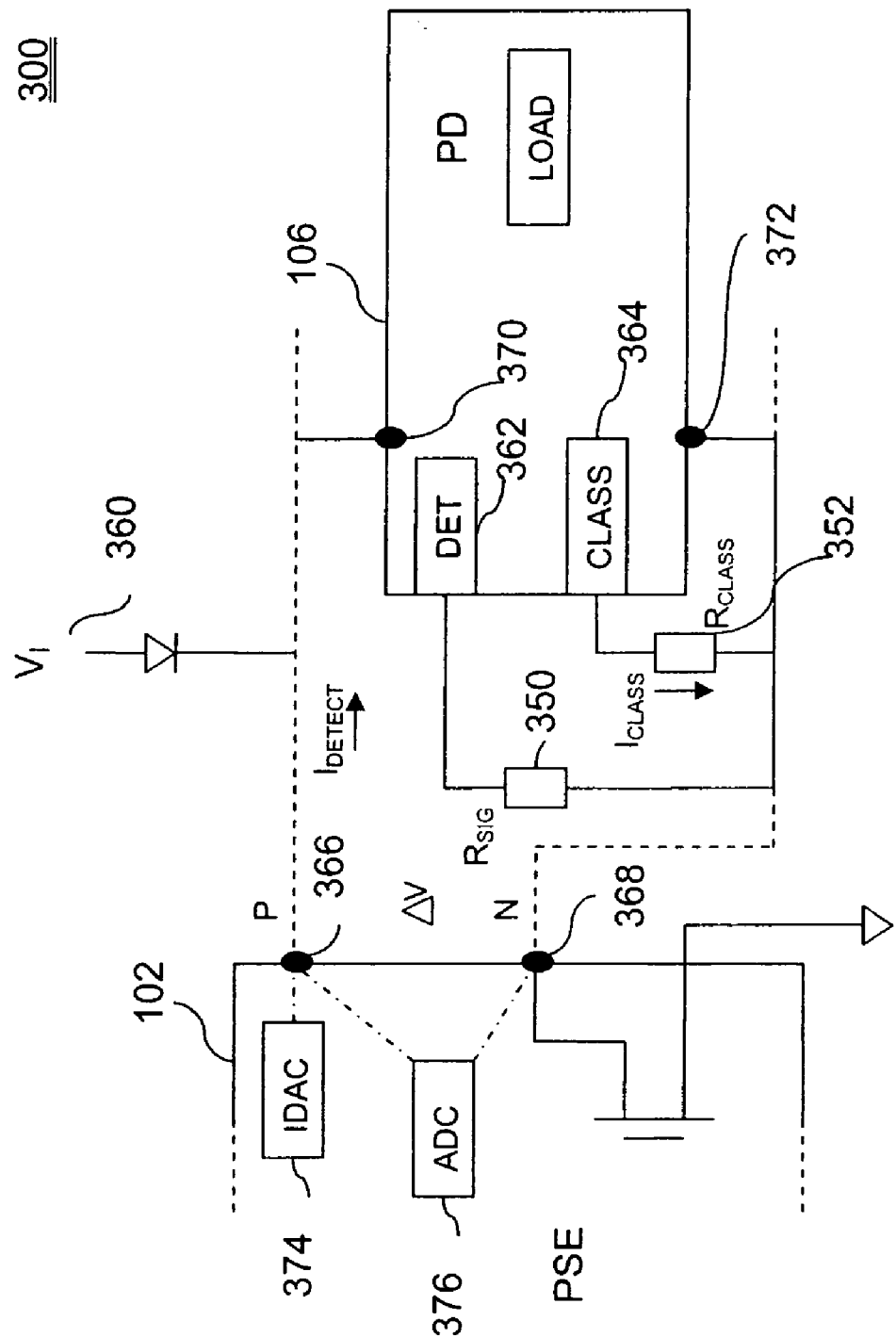
FIG. 3 illustrates a PD chip architecture with conventional device detection and power classification.

As stated earlier, detection and power classification of a PD is a part of the process of supplying power to a PD using PoE. PD detection and power classification will be described with reference to FIG. 3, which illustrates conventional PD chip architecture 300. As shown in FIG. 3, positive terminal 366 of PSE 102 is connected to a first terminal 370 of PD 106, and negative terminal 368 of PSE 102 is connected to a second terminal 372 of PD 106. A voltage source 360 is connected to the positive terminal 366 of PSE 102 to provide input voltage $V_I$. According to the current IEEE 802.3Af™ standard, the operating voltage should range from 44V to 57V.

As shown in FIG. 3, PD 106 includes detection circuitry 362 and classification circuitry 364. A signature resistance 350 is located between detection circuitry 362 and the negative terminal 368 of PSE 102. Signature resistance 350 is used to determine the validity of PD 106, as will be described in more detail below. A classification resistor 352 is located between classification circuitry 364 and the negative terminal 368 of PSE 102. Current ($I_{CLASS}$) across the classification resistor 352 determines the power classification signature for PD 106, as will also be discussed in more detail below.

Before power is supplied to PD 106, PSE 102 first determines whether PD 106 is a compatible device. This is called 'detection.' For detection, PSE 102 probes the current ($I_{DETECT}$) using an internal digital-to-analog converter 376 connected to positive terminal 366. In addition, PSE 102 measures the voltage drop ($\Delta V$) between positive terminal 366 and negative terminal 368 using an internal analog-to-digital converter 376. Alternatively, a bandgap voltage (e.g., in the range 2.7V to 10.1V) (not shown) can be applied at PD 106. The resistive signature $R_{SIG}$ 350 is then calculated according to $R_{SIG}=\Delta V/I_{DETECT}$. If $R_{SIG}$ is calculated to be an expected value (e.g., approximately 25K ohms, or within a specified resistance value range), then PD 106 is determined to have a valid signature and is deemed a compatible valid device. If PD 106 is deemed a non-compatible device, then power will not be supplied to PD 106.

After detection of a valid PD, power classification occurs. Power classification is used to determine the range of minimum power needed at the output of PSE 102 and, in turn, the range of maximum power to be used by PD 106, according to IEEE 802.3Af™. For power classification, PSE 102 applies a voltage at PD 106 (such as via a bandgap circuit, for example). For voltage applied to PD 106 ranging from 14.5V to 20.5V, IEEE 802.3Af™ currently defines four classifications (classes 0-3) of power ranges, with a fifth classification (class 4) reserved for future use (but currently treated as class 0). Once power classification has occurred, power can be supplied to the PD according to the power classification.

Figure 6:
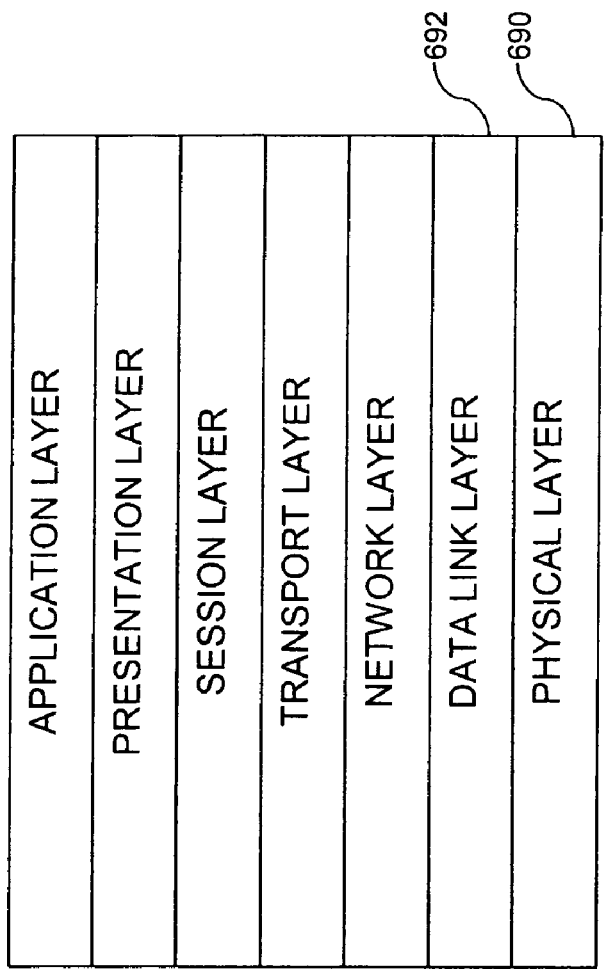
FIG. 6 illustrates the Open System Interconnection (OSI) networking model, a part of which is incorporated into embodiments of the present invention.

In the PSE/PD PoE system described above, the PD detection and power classification typically occurs using a crude physical communications layer through which basic voltage and current measurements are taken and communicated. (This physical communications layer is equivalent to the physical layer 690 shown in FIG. 6 as part of the Open System Interconnection (OSI) networking model, for example.) For example, the return power to the PSE can be modulated by the PD to provide a slow one-way communications channel. This communication occurs upon connection (or power-up, if already connected), and is a one-way, one-time communication. The communication is from PD 106 to PSE 102, and the amount of power provided by PSE 102 to PD 106 is a static (i.e., unchanging) amount of power. PoE power supply performed in this manner is fine for a single PD or even a small number of networked PDs. However, it is not an optimal system for a large number of PDs or even a small number of personal computing devices, such as laptop computers, that have higher power requirements. Using a PoE power supply system as just described to manage the power supplied to personal computing devices in an enterprise environment would present various issues, such as increased noise, power supply cooling issues, and a very expensive switch and power supply.

Figure 4:
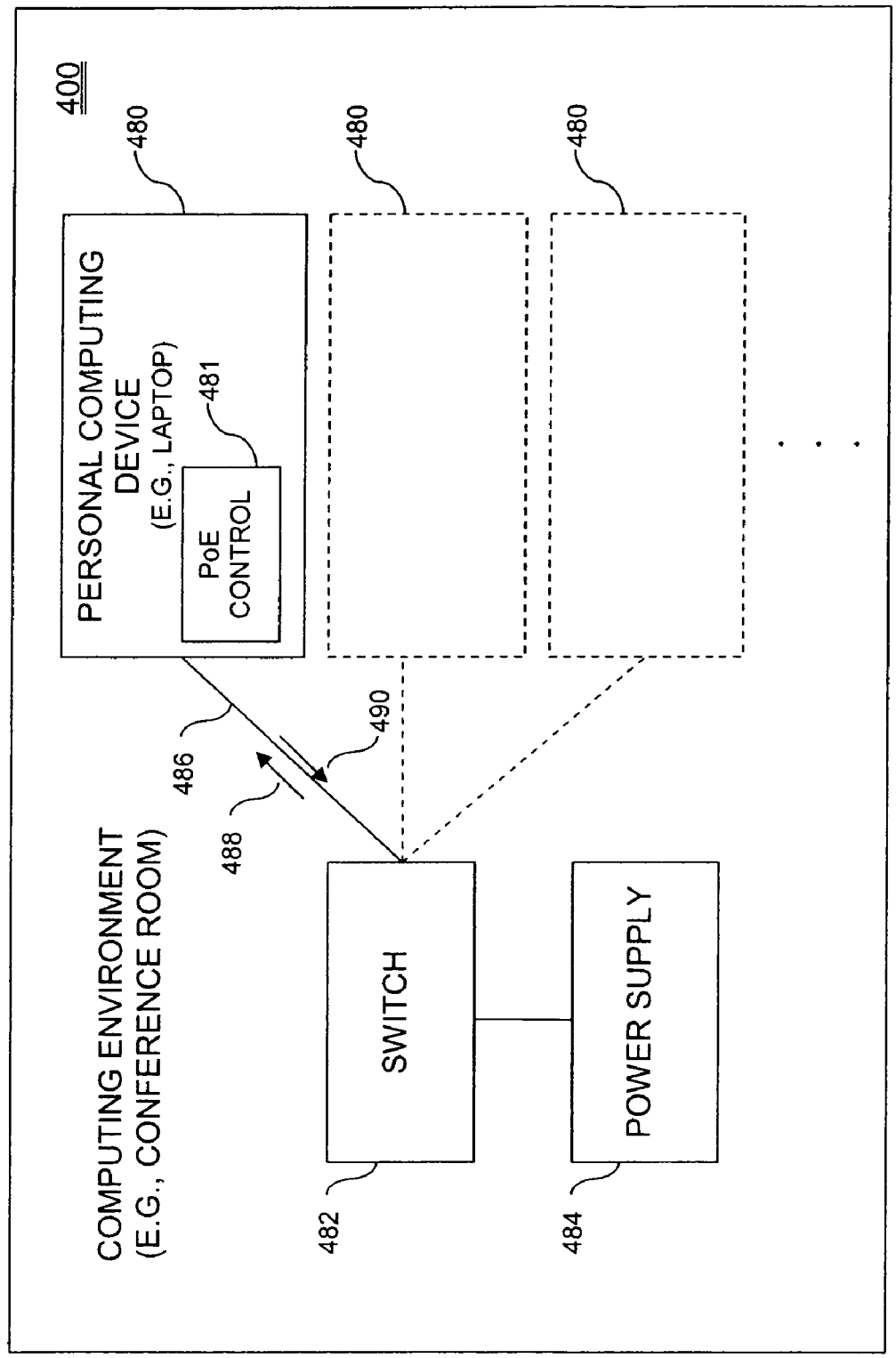
FIG. 4 illustrates a PoE configuration in a computing environment, according to embodiments of the present invention.

One way to address these enterprise environment PoE issues is to allow a PoE personal computing device to dynamically communicate its power needs as conditions change so that the power of a power supply can be reallocated among any connected personal computing devices in an optimum and efficient manner. A solution is shown in FIG. 4. FIG. 4 shows a computing environment 400 that includes one or more personal computing devices 480. Computing environment 400 can be a conference room, for example, or any other environment in which one or more personal computing devices, such as laptop computers, are networked. However, the invention is not to be limited to personal or laptop computers, as would be appreciated by those skilled in the relevant art(s). A personal computing device as described herein can include a personal computer, a laptop, a handheld computing device, or any other powered device that is capable of communicating its power-related information in the manner described herein.

As shown in FIG. 4, a switch 482 includes interface(s) 486 to the one or more personal computing devices 480. The switch 482 is also connected to a power supply 484. Communications between switch 482 and personal computing device (s) 480 occur over interface(s) 486. Interface(s) 486 can include any communication link that can handle PoE, such as various types of Ethernet cabling, for example.

Each personal computing device 480 includes a PoE control module 481 that can communicate with switch 482. For example, switch 482 can poll personal computing device 480 for its power requirements via interface 486 in direction 488. Likewise, personal computing device 480 can provide its power requirement information to switch 482 via PoE control module 481 over interface 486 in direction 490. Switch 482 can then allocate an amount of power for a particular personal computing device 480 and direct that power to personal computing device 480 again via interface 486 in direction 488. Using a capable protocol, these communications between switch 482 and personal computing devices 480 can facilitate the supply of power supplied using PoE in a dynamic manner as conditions (e.g., power needs) change.

The PoE control module 481 can be part of a PSE/PD system as described above with respect to FIGS. 1-3. Those skilled in the relevant art(s) will appreciate that this control can be implemented in any level of integration on the PD, including, for example, within the DC-DC converter, the PD controller, and/or associated field-effect transistors (FETs).

Figure 5:
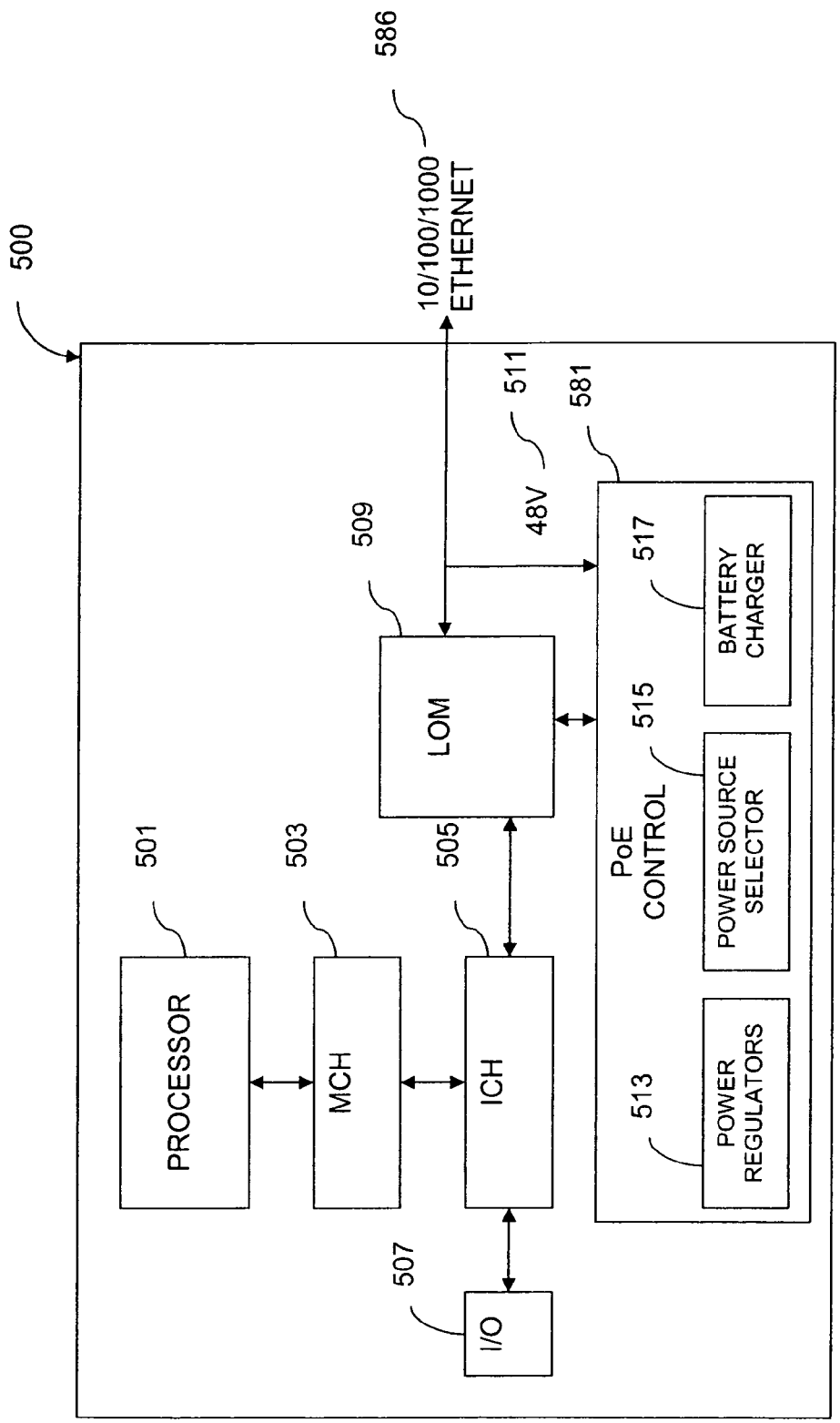
FIG. 5 is a general block diagram that illustrates a conventional configuration of a personal computing device motherboard with Power over Ethernet (PoE) through a LAN-on-Motherboard (LOM) system.

Alternatively, the PoE control module 481 can be part of a LAN-On-Motherboard (LOM)/PD system. A LOM is a chip embedded on a motherboard to handle network connections. An example of a LOM/PD system on the motherboard of a personal computing device is shown in FIG. 5. FIG. 5 is a general block diagram of a motherboard 500 of a personal computing device. Motherboard 500 includes, among other chips/modules, a processor chip 501, a memory chip 503, an interface chip 505, and an input/output (I/O) interface 507. The interface chip 505 interfaces with a LOM chip 509, which in turn, interfaces with a PoE control module 581. PoE control module 581 can include, for example, power regulators 513, a power source selector 515, and a battery charger 517. LOM chip 509 also has an Ethernet interface 586, which can interface with a switch, such as switch 482 of FIG. 4. Power, such as voltage 511 (e.g., 48V), can be delivered over the Ethernet interface 586 to PoE control module 581, in order to charge a battery, for example. In a LOM/PD system, PoE control can be implemented into any level of integration on the LOM. In addition, the implementation can include both wired and wireless capability.

Control module 481 is not to be limited to the PSE/PD and LOM/PD systems. Those skilled in the relevant art(s) will appreciate that other current and future PoE systems will be able to benefit from this invention.

As stated earlier, a communications protocol that is capable of allowing repeated communications between switch 482 and personal computing device(s) 480 can facilitate the supply of power using PoE in a dynamic manner as conditions (e.g., power needs) change. A layer such as the physical layer (Layer 1) of the OSI networking model will not facilitate this communication because it only provides one-way, one-time (static) communication and can be very slow. However, other layers of the OSI networking model, such as the data link layer 692 (Layer 2), can facilitate this communication. Whereas Layer 1 conveys a bit stream (including electrical impulses, light, or radio signals, for example) through a network at the electrical and mechanical level, providing a hardware means of sending and receiving data on a carrier, Layer 2 conveys data packets that include encoded bits and can provide transmission protocol knowledge and management including handling data errors. Layer 2 provides the flexibility needed to dynamically communicate many more power-related parameters thereby facilitating better power allocation decisions and more efficient usage of the power supply.

A more detailed description of the features and embodiments of the present invention follows, with reference to FIGS. 4 and 7-12.

Figure 7:
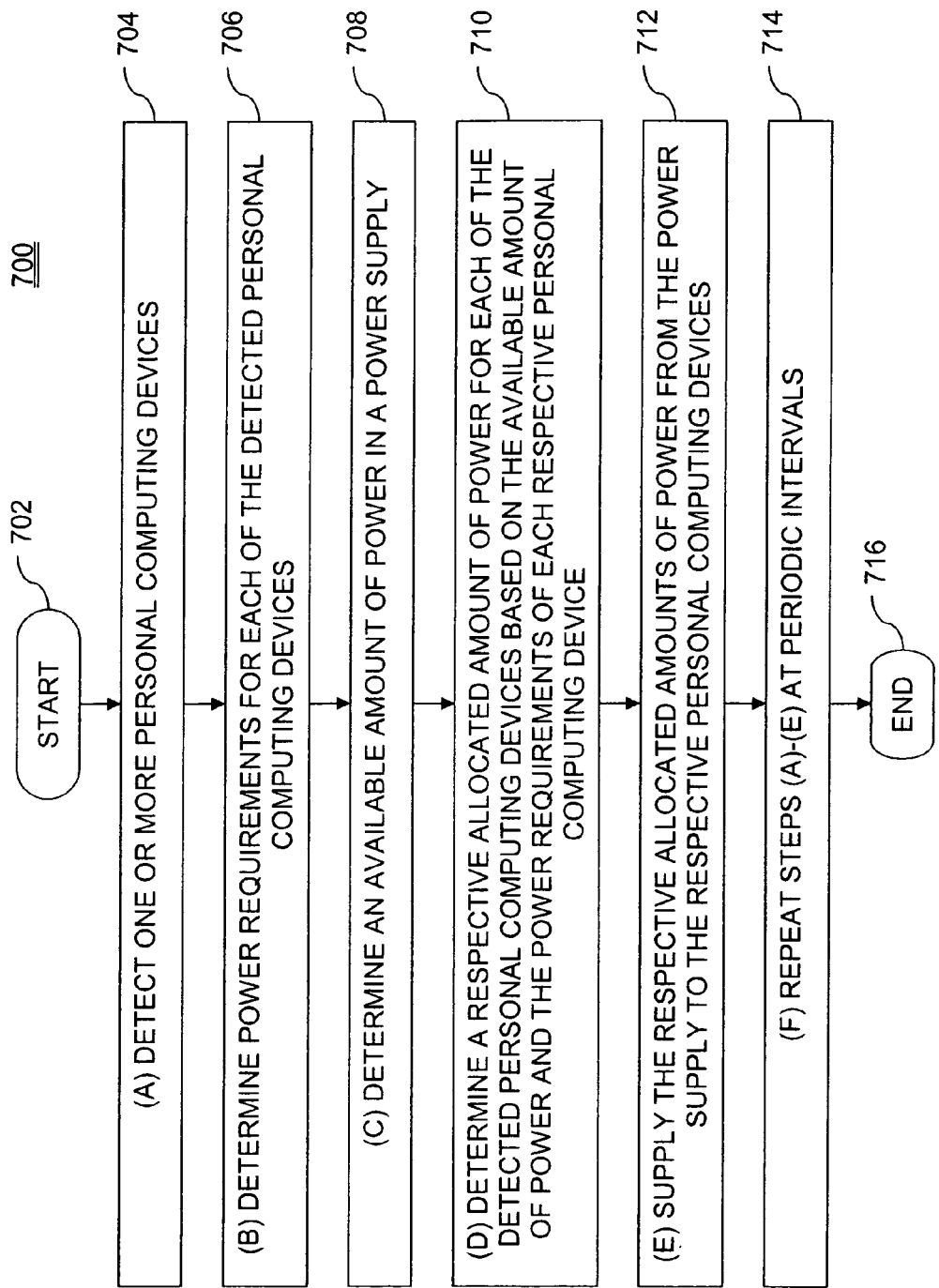
FIG. 7 is a flowchart that illustrates a method of dynamically supplying power to one or more personal computing devices, according to embodiments of the present invention.
Figure 8:
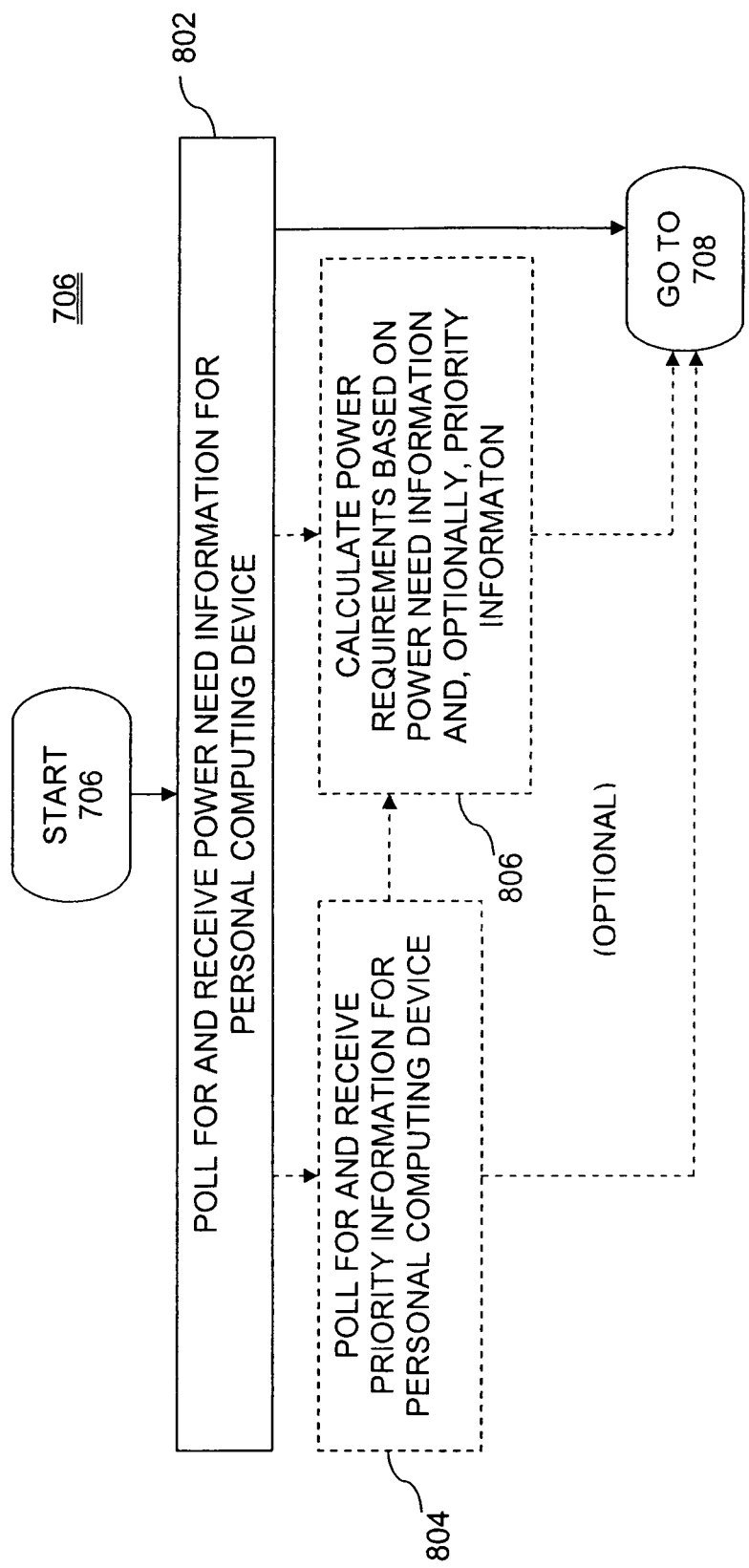
FIG. 8 is a flowchart illustrating step 706 of FIG. 7 in more detail.

FIG. 7 is a flowchart describing a method 700 of dynamically supplying power to one or more personal computing devices. The description of method 700 also includes reference to the system of FIG. 4 for ease of understanding. Method 700 starts at step 702 and immediately proceeds to step 704.

In step 704, one or more personal computing devices is detected. For example, referring back to FIG. 4, switch 482 detects one or more personal computing devices 480.

In step 706, power requirements for each of the detected personal computing devices is determined. Step 706 is described in more detail in FIG. 8. In step 802, polling occurs for power need information of each detected personal computing device, and the power need information is received. In optional step 804, polling occurs for priority information concerning each personal computing device, and the priority information is received. In optional step 806, power requirements are calculated, if necessary, from the power need information and, optionally, the priority information. In other words, referring to FIG. 4, switch 482 can poll each personal computing device 480 for its power requirements via interface 488. (Alternatively, switch 482 can poll a network server for this information, or can poll both a personal computing device and a network server, as will be discussed in more detail below with reference to FIG. 11.) The communication between switch 482 and personal computing device 480 can include communication using a Layer 2 type communication layer, as described above. Power requirements can be based on current physical information such as voltage usage and current draw. Power requirements can also be based on, for example, battery charge status, power load, power mode, load status, and backup needs of a personal computing device. Other factors that can be included in determining power requirements are the number and type of devices attached to a personal computing device. In addition to power need information, such as that just described, power requirements can also include priority information for determining a priority order in which multiple personal computing devices are to receive power. Priority information can include priority algorithms, as will be discussed in more detail below. The power requirements may be readily available at the personal computing device, or may need to be calculated. If calculations are necessary, the personal computing device 480 and/or the switch 482 can perform the calculations. Power classification of the personal computing device 480 is included in this step, and is described in more detail in the description of method 900 (FIG. 9) below.

In step 708, an available amount of power at the power supply is determined. For example, switch 482 determines the available amount of power at power supply 484 that can be provided to one or more of the personal computing devices 480. In a related embodiment, more than one power supply 484 can exist, allowing switch 482 to direct the addition or subtraction of power supplies as power needs increase or decrease.

In step 710, a respective allocated amount of power is determined for each of the personal computing devices based on the determined power requirements and available amount of power at the power supply. For instance, switch 482 determines a respective allocated amount of power to be provided to a personal computing device 480 based on that device's determined power requirements and the amount of power available at power supply 484. In an embodiment further depicted in FIG. 12, the allocated amount of power can be communicated to the corresponding personal computing device, and a confirmation that the allocation is acceptable can be requested. For example, in step 1202, which follows step 710, the allocated amount of power is communicated to the each respective personal computing device with a request for confirmation that the allocated amount of power is acceptable. In step 1204, a confirmation from each personal computing device is received stating whether its allocated amount of power is acceptable. The method continues at step 712.

In step 712, the respective allocated amounts of power are supplied from the power supply to the respective personal computing devices. In the embodiment depicted in FIG. 12, only those devices that confirmed their allocated amounts of power as acceptable would receive power. In one simple embodiment, power is supplied to a personal computing device when a charge of the personal computing device is determined to be below a predetermined level. In a related embodiment, the supply of power is stopped when the charge of the personal computing device is determined to have reached a predetermined level (e.g., full charge).

In a situation where a power supply does not have enough power for all of the personal computing devices with power needs, a priority order of personal computing devices may need to be determined. For example, it may be important that a laptop running a projector in a conference room maintain a certain level of power. As another example, it may be preferred that a laptop of a higher level employee (e.g., an executive vice president) have a higher priority for power than that of a lower-level employee (e.g., an entry-level engineer). For these reasons, the supply of power in step 712 can depend upon one or more priority algorithms used to determine a priority order in which personal computing devices are to receive power and how much. A priority algorithm can be executed by a personal computing device 480 to determine its own priority prior to communicating it to switch 482, or switch 482 can execute the algorithm. In one embodiment, the priority order is determined based on programmed priority settings reported for each personal computing device. In another embodiment, the priority order is determined based on calculated priority settings based on the power requirements reported for the personal computing device. In yet another embodiment, the priority order is determined based on a combination of programmed and calculated priority settings.

In one embodiment, a priority order for receiving power is determined on a "first-come, first-served" basis in which a first personal computing device that is determined to have its charge drop below a predetermined level is the first personal computing device to be supplied its allocated amount of power. In a related embodiment, the supply of power to the first personal computing device can be stopped when its charge is determined to have reached a predetermined level, at which time the next priority personal computing device can be supplied with power.

In another embodiment, a priority order for receiving power is determined based on which personal computing device is determined to have a lowest charge. In this embodiment, a first personal computing device determined to have the lowest charge is the first personal computing device to be supplied its allocated amount of power. In a related embodiment, the supply of power to the first personal computing device is stopped when its charge is determined to have reached a predetermined level, at which time the next priority personal computing device can be supplied with power. The predetermined level can be full charge or can be a charge level that is higher than that of the next priority personal computing device, for example.

In yet a further embodiment, a priority order for receiving power is determined based on which personal computing device is determined to have a highest priority assignment. In this embodiment, a first personal computing device determined to have the highest priority assignment is the first personal computing device to be supplied its allocated amount of power. The priority assignment can be preprogrammed in the personal computing device or calculated by the personal computing device or the switch, for example, based on factors such as company rank or seniority of the assigned owner of the personal computing device, for example. In a related embodiment, the supply of power to the first personal computing device is stopped when its charge is determined to have reached a predetermined level (e.g., full charge), at which time the next priority personal computing device can be supplied with power. In another related embodiment, the supply of power to the first personal computing device is stopped when its priority assignment is determined to have dropped below that of a second personal computing device that is next in priority order, at which time the second personal computing device can be supplied with power.

In preferred embodiments, when a combination of power draw and battery charge for a first personal computing device assigned a first priority reaches a level where the first personal computing device is no longer at a higher priority than a second device, various responses can occur. In one embodiment, the power allocated to the first device is reduced so as to allocate more power to the second device. In another embodiment, the power supplied to the first device is stopped and reallocated to the second device. In a further embodiment, the power allocated to the first device is unchanged, for example, when there is enough power available for both the first and second devices.

In step 714, steps 704 through 712 are repeated, providing a dynamic supply of power to detected personal computing devices. The determination of a priority order for receiving power will also then change dynamically, allowing the supply of power to personal computing devices in an enterprise setting to be optimized. Method 700 ends at step 716.

Figure 9:
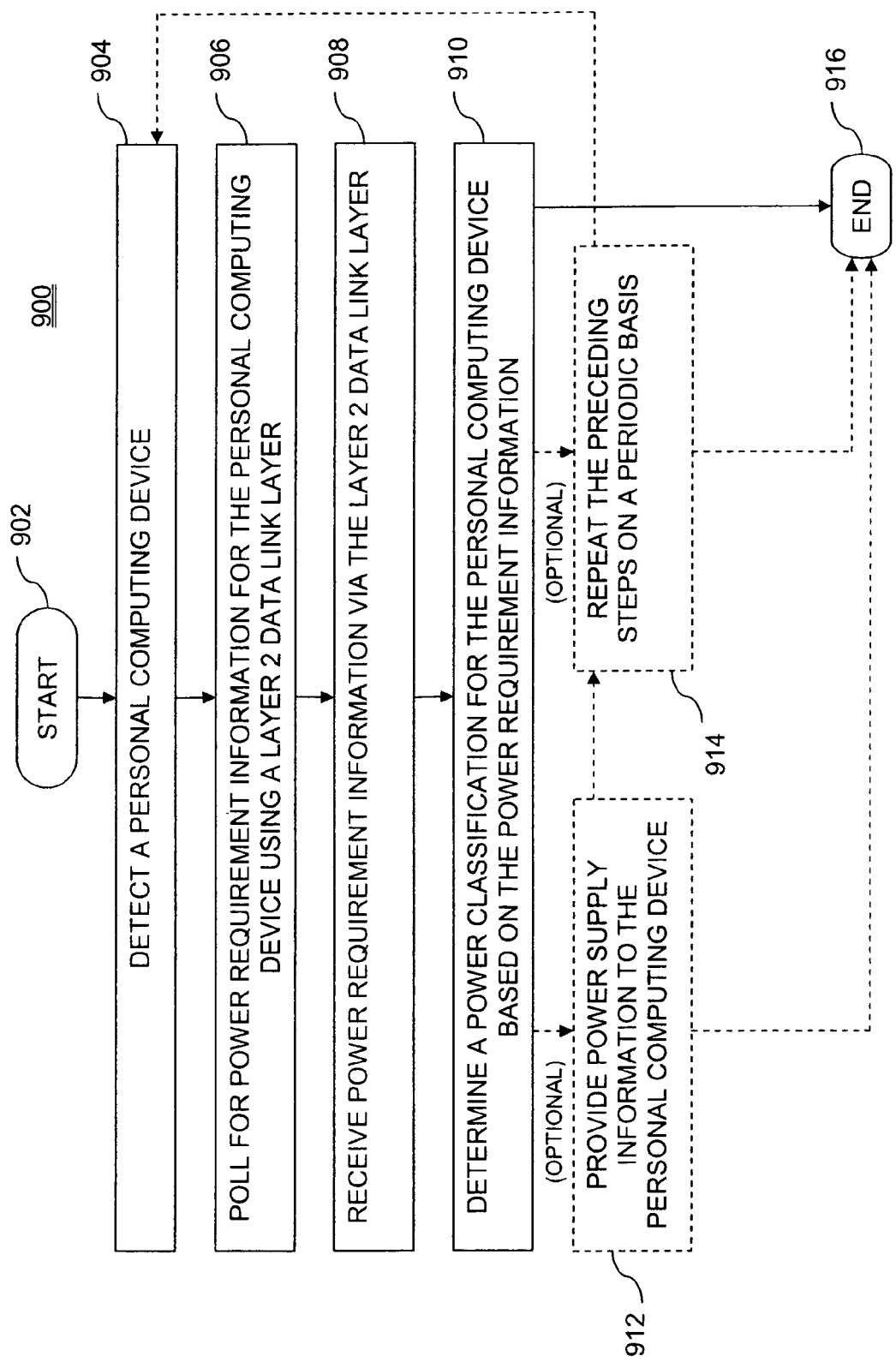
FIG. 9 is a flowchart that illustrates a method of classifying power for one or more personal computing devices, according to embodiments of the present invention.
Figure 10:
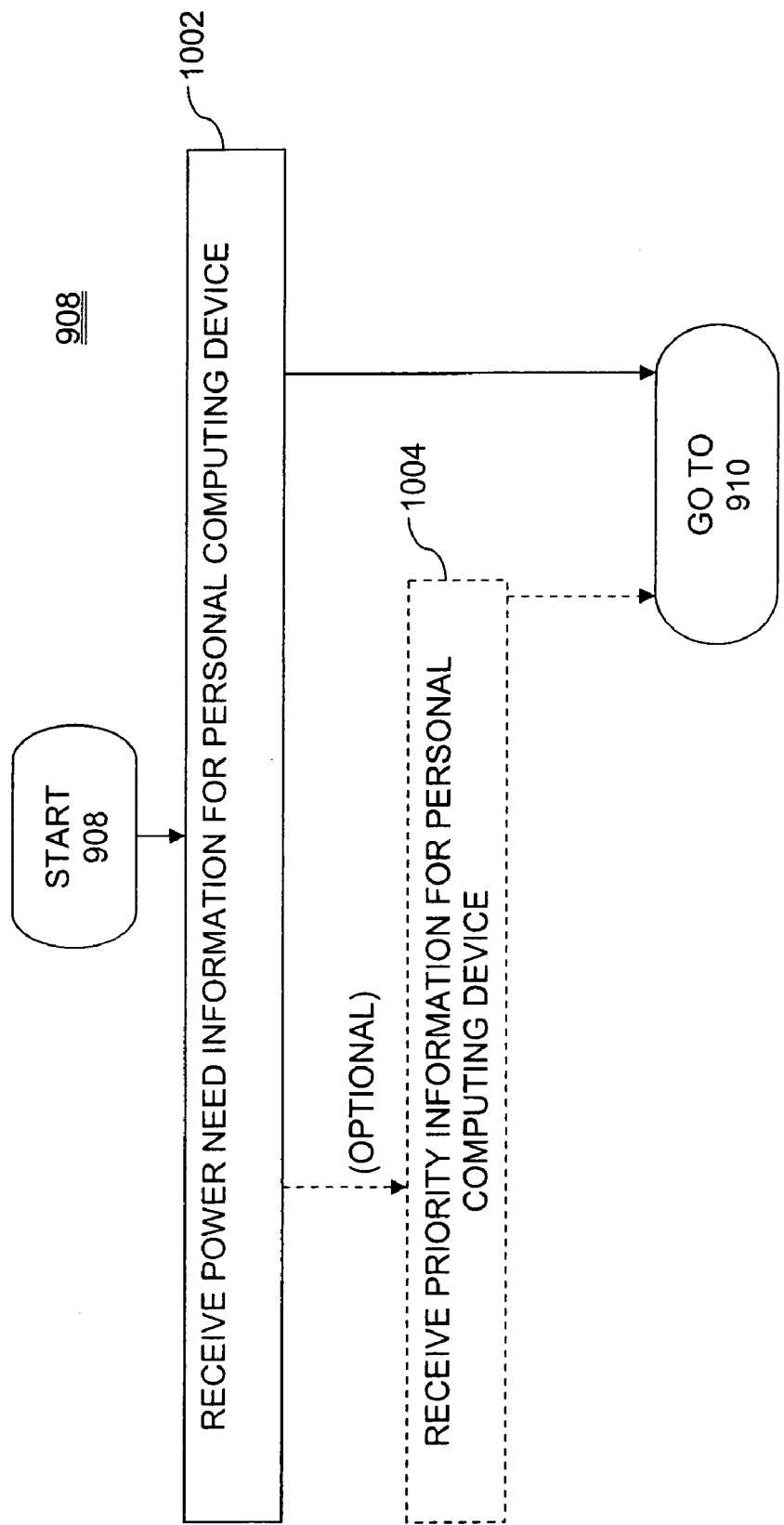
FIG. 10 is a flowchart illustrating step 908 of FIG. 9 in more detail.

FIG. 9 is a flowchart describing a method 900 of classifying power for one or more personal computing devices using a data link layer (Layer 2). The description of method 900 also includes reference to the system of FIG. 4. Method 900 starts at step 902 and immediately proceeds to step 904.

In step 904, one or more personal computing devices is detected. For example, referring back to FIG. 4, switch 482 detects a personal computing device 480.

In step 906, polling occurs for power requirement information using a Layer 2 data link layer. For example, in one embodiment, switch 482 queries personal computing device 480 for its power requirements. In another embodiment, switch 482 can query a connected network server for the information, as described below in reference to FIG. 11. In a further environment, switch 482 can query both personal computing device 480 and a connected network server.

In step 908, the power requirement information for the personal computing device is communicated using the Layer 2 data link layer. Step 908 includes receiving power need information for the personal computing device and, optionally, receiving priority information for the personal computing device, as shown in steps 1002 and 1004 of FIG. 10. In other words, switch 482 receives power requirements for personal computing device 480. Both the polling for and receiving of this information can include transporting data using OAM (Operation, Administration, and Maintenance) protocol packets, SNMP (Simple Network Management Protocol) protocol packets, LLDP (Link Layer Discovery Protocol) protocol packets, or any another type of packets that can be used with the Layer 2 data link layer, as would be understood by those skilled in the relevant art(s). The power requirements can include current physical information such as voltage usage and current draw. The power requirements can also include such information as battery charge status, power load, and/or power mode of the personal computing device. In addition to power need information, such as that just described, power requirements can also include priority information for determining a priority order in which multiple personal computing devices are to receive power. The priority information can also include one or more priority algorithms. The power requirements may be readily available at the personal computing device, or may need to be calculated. If calculations are necessary, the personal computing device 480 and/or the switch 482 can perform the calculations. Likewise, a priority algorithm can be executed by personal computing device 480 to determine its own priority prior to communicating it to switch 482, or switch 482 can execute the algorithm.

In step 910, a power classification for the personal computing device is determined based on the power requirement information. Referring to FIG. 4, switch 482 determines the power classification of personal computing device 480 based on the power requirement information received or calculated by switch 482.

Power supply information can optionally be provided to the personal computing device in step 912. For example, switch 482 can provide personal computing device 480 with power supply information. Personal computing device 480 can then adjust its application load and/or notify the user of its power status based on that information.

Steps 904 through 910 (and optionally 912) can optionally be repeated on a periodic basis in step 914. Repeating these steps on a periodic basis allows the power classification to be dynamically updated for each detected personal computing device. Method 900 ends at step 916. It would be understood by those skilled in the relevant art(s) that method 900 can be included in steps 704/706 of method 700.

Figure 11:
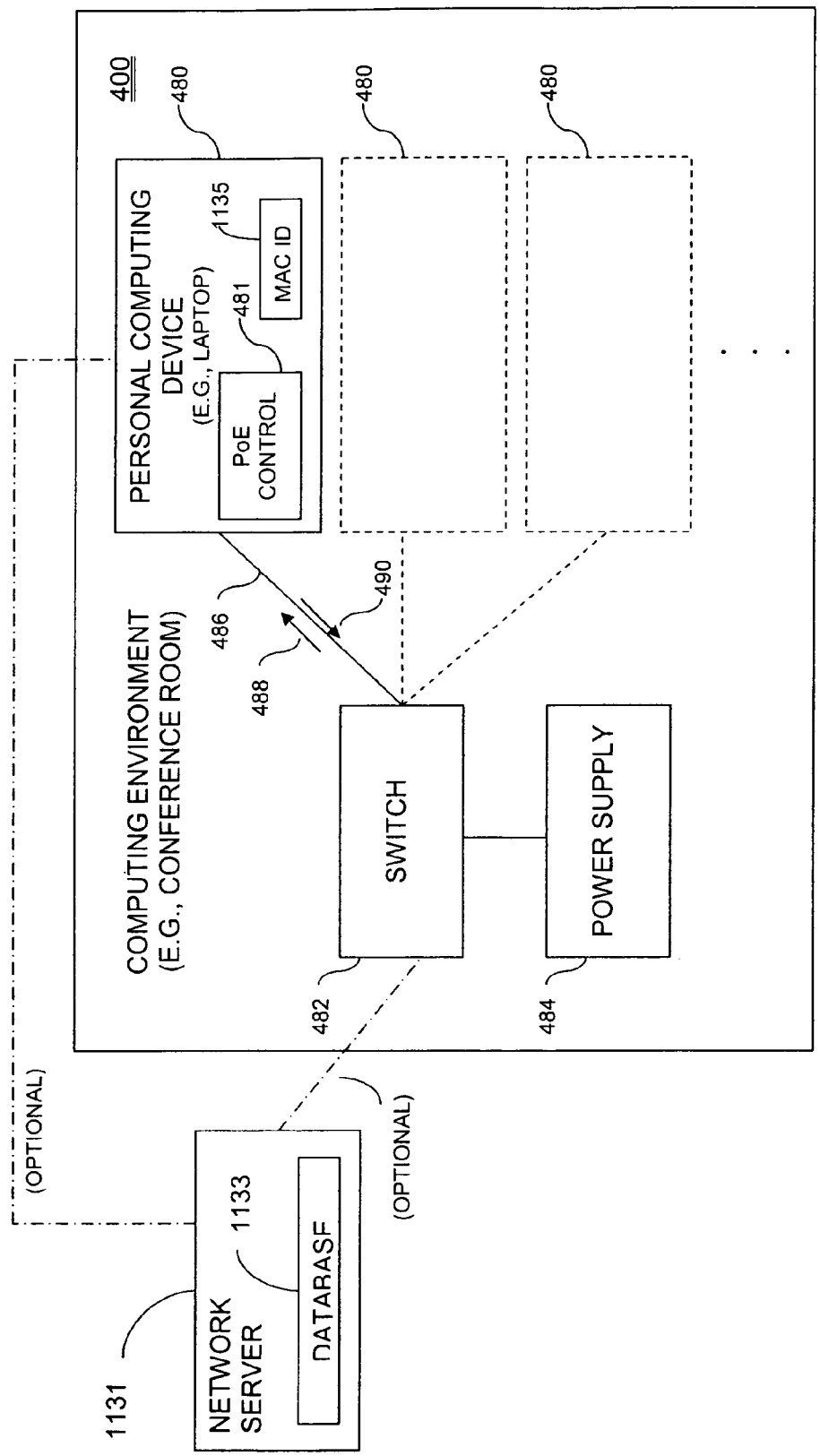
FIG. 11 illustrates a PoE configuration that includes a network server, according to embodiments of the present invention.
Figure 12:
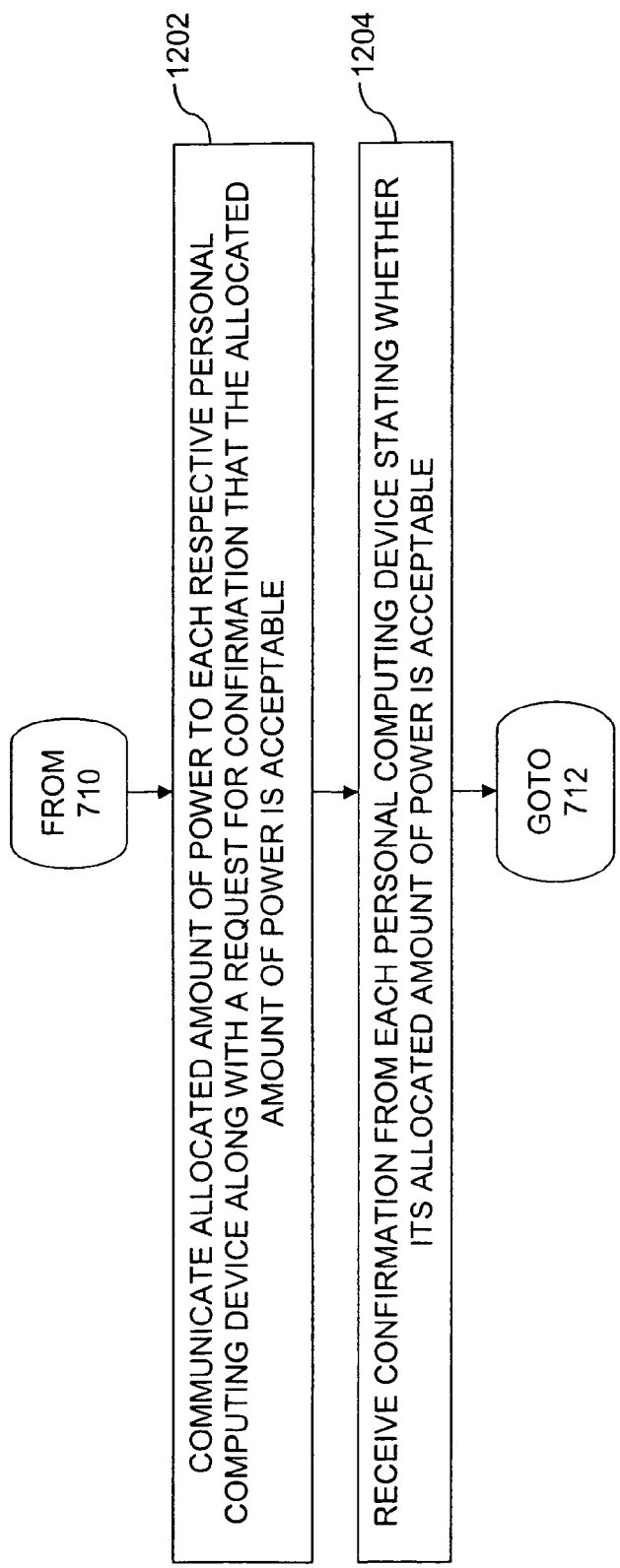
FIG. 12 is a flowchart illustrating further steps of the method shown in FIG. 7, according to an embodiment of the present invention.

As discussed above, a switch, such as switch 482 of FIG. 4, can optionally poll for, and receive, priority information concerning each detected personal computing device 480, along with power need information. In the embodiments described above, the switch can poll for, and receive, priority information (which can also include priority algorithms such as those discussed above) directly from a personal computing device. In another embodiment, the switch can poll for, and receive, the priority information (as well as any other available information it needs, such as power need information or priority algorithms, for example) from a network server accessible by the switch. In yet another embodiment, the switch can poll both a personal computing device and a network server for some or all of the needed information. These embodiments are illustrated in FIG. 11. Switch 482 can determine an identification (e.g., a MAC address 1135) for each detected personal computing device 480, and request from network server 1131 priority information (or any other available useful information) for those identifiers found in database 1133. Switch 482 can then determine a priority order of personal communication devices to receive power based on power needs, priority information, and/or priority algorithm(s) that it collects. It can determine the priority order based on one or more algorithms (as those discussed above) that are resident at the switch or downloaded from either network server 1131 or personal computing device(s) 480.

In a related embodiment, in which power needs, priority information, and/or priority algorithm(s) are provided to a switch by a personal computing device, some or all of the power needs, priority information, and/or priority algorithm(s) can be downloaded to the personal computing device from connected network server 1131. For example, priority information, one or more priority algorithms, and/or power need information can be downloaded to a personal computing device during regular enterprise updates controlled by an enterprise's IT department. In an embodiment, the personal computing device can then execute a priority algorithm in order to provide its priority information to the switch. Regardless of the source or method of collecting power need and priority information for each personal computing device, the determination of a priority designation based on this collected information results in a discrete overall power priority for each individual device.

The foregoing description characterizes an intelligent PoE system in which the power supplied to multiple personal computing devices can be dynamically and optimally classified and managed based on changing power-related conditions. It allows a power supply to be effectively oversubscribed in order to support a larger number of personal computing devices. Because power is only allocated to those personal computing devices that need it, and this allocation is reassessed on a regular basis, noise is reduced and power supply cooling issues are minimized. In addition, the overall cost of a switch is minimized because the necessary capacity of the power supply is greatly reduced.

This invention relating to power management in a PoE communication system has been described herein in an Ethernet environment for ease of discussion. Accordingly, the scope of the invention is meant to include all forms of Ethernet configurations, and data speeds, including for example 10/100 Ethernet, 1 Gigabit Ethernet, and 10 Gigabit Ethernet. However, the invention may not limited to Ethernet communications, and may be utilized in other communications standards or configurations, as will be understood by those skilled in the arts based on the discussion provided herein. In other words, the scope of the invention is not limited to Ethernet, and may be used in other communication standards, as will be understood by those skilled in the arts based on the discussion given herein.

Likewise, the invention presented herein has been described as being particularly beneficial to systems including PDs such as personal computing devices (e.g., personal or laptop computers). The scope of the invention is not to be limited to personal or laptop computers, however, as would be appreciated by those skilled in the relevant art(s). The invention may also benefit other powered devices that are capable of communicating their power needs as described herein, as would be understood by those skilled in the arts based on the discussion provided herein. Indeed, the above-described invention can be implemented with various variations and generations of PDs, switches, and PSE, LOM, and/or other PoE solutions.

CONCLUSION

While various embodiments of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. In a Power-over-Ethernet (PoE) system, a system for classifying power for a plurality of personal computing devices that each have a corresponding PoE control module from among a plurality of PoE control modules, comprising:
   a switch configured to connect to the plurality of personal computing devices;
   wherein the switch is configured to communicate with each PoE control module using a communications link to communicate power requirement information between the switch and the plurality of PoE control modules,
   wherein the switch is configured to poll at least two PoE control modules from among the plurality of PoE control modules for the power requirement information using the communications link, wherein the switch is configured to determine power classifications for at least two of the plurality of personal computing devices based on the power requirement information, wherein the switch is configured to re-poll the at least two PoE control modules and to re-determine the power classifications for the at least two PoE control modules on a periodic basis, and wherein the switch is configured to provide power supply information to the the at least two of the plurality of personal computing devices based on the power classifications.

2. The system of claim 1, further comprising:
a power supply coupled to the switch.

3. The system of claim 1, wherein the at least two of the plurality of personal computing devices is configured to adjust their respective application load based on the power supply information.

4. The system of claim 1, wherein the communications link is a layer 2 data link.

5. The system of claim 1, wherein the power requirement information is selected from a group consisting of:
battery charge status of a particular one of the plurality of personal computing devices;
power load of the particular personal computing device;
power mode of the particular personal computing device;
load states of the particular personal computing device;
devices attached to the particular personal computing device;
backup needs of the particular personal computing device; and
priority information for the particular personal computing device.

6. The system of claim 1, wherein the at least two PoE control modules are configured to provide the power requirement information to the switch using the communications link.

7. The system of claim 1, wherein the plurality of personal computing devices comprise:
a plurality of laptop computers.

8. The system of claim 1, wherein the at least two PoE control module modules are part of a Power Source Equipment/Powered Device (PSE/PD) control system.

9. The system of claim 1, wherein the at least two PoE control modules are part of a LAN-On-Motherboard/Powered Device (LOM/PD) control system.

10. The system of claim 9, wherein a level of integration on the LOM includes wired and wireless capability.

11. The system of claim 1, further comprising:
a network server having a database,
wherein the switch is further configured to poll the network server for the power requirement information from the database.

12. The system of claim 11, wherein the network server is further configured to provide the power requirement information to the switch using the communications link.

13. The system of claim 1, wherein the at least two of the plurality of personal computing devices are configured to notify their respective user of power status based on the power supply information.

14. The system of claim 1, further comprising:
a transport mechanism configured to transport the power information, the transport mechanism being selected from a group consisting of:
OAM protocol packets;
SNMP protocol packets; and
LLDP protocol packets.

15. In a Power-over-Ethernet (PoE) system, a method of classifying power for a plurality of personal computing devices, comprising:
detecting a personal computing device;
polling the personal computing device for power requirement information using a communications link;
receiving the power requirement information from the personal computing device via the communications link;
determining a power classification for the personal computing device based on, the power requirement information;
re-polling the personal computing device;
re-determining the power classification for the personal computing device on a periodic basis; and
providing power supply information to the personal computing device based on the power classification.

16. The method of claim 15, further comprising:
adjusting, by the personal computing device, an application load based on the power supply information.

17. The method of claim 15, wherein the polling, receiving, and determining are repeated on a periodic basis.

18. The method of claim 15, further comprising:
notifying, by the personal computing device, a user of power status based on the power supply information.

19. The method of claim 15, wherein the communications link is a layer 2 data link.

20. The method of claim 15, wherein the polling and receiving comprises:
transporting data using at least one selected from a group consisting of:
OAM protocol packets;
SNMP protocol packets; and
LLDP protocol packets.

21. The method of claim 15, wherein the power requirement information is at least one selected from a group consisting of:
battery charge status of the personal computing device;
power load of the personal computing device;
power mode of the personal computing device;
load states of the personal computing device;
devices attached to the personal computing device;
backup needs of the personal computing device; and
priority information for the personal computing device.

* * * * *

UNITED STATES PATENT AND TRADEMARK OFFICE
CERTIFICATE OF CORRECTION

PATENT NO. : 8,266,460 B2
APPLICATION NO. : 12/805116
DATED : September 11, 2012
INVENTOR(S) : Wael William Diab It is certified that error appears in the above-identified patent and that said Letters Patent is hereby corrected as shown below:

At column 1, lines 52-53, please replace "Internet Protocol (EP) phones" with --Internet Protocol (IP) phones--.

At column 13, line 12, please replace "information to the the at least two" with --information to the at least two--.

At column 13, line 44, please replace "control module modules" with --control modules--.

Signed and Sealed this
Twenty-sixth Day of February, 2013

Teresa Stanek Rea
*Acting Director of the United States Patent and Trademark Office*